May 14, 1957 G. F. FREDERICKS 2,792,322
PRINTER'S BLANKET
Filed Nov. 29, 1954
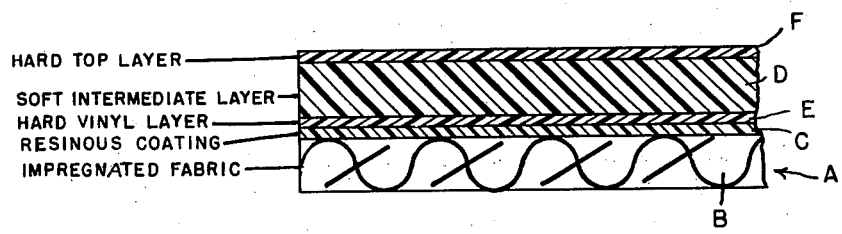
INVENTOR.
GEORGE F. FREDERICKS
BY
ATTORNEYS

United States Patent Office 2,792,322
Patented May 14, 1957

2,792,322
PRINTER'S BLANKET

George F. Fredericks, Trenton, N. J., assignor to National Automotive Fibres, Inc., Detroit, Mich., a corporation of Delaware Application November 29, 1954, Serial No. 471,606

5 Claims. (Cl. 154—54.5)

The invention relates to printer's blankets which are used in connection with printing apparatus to compensate for slight irregularities in height of type or other separate printing members so as to bring the printing surface more nearly into a common plane.

It is the object of the invention to obtain a construction which is very efficient in its operation and which has a long life during which it retains its essential characteristics; also, one which can be produced at reasonable cost.

With these objects in view the invention comprises a laminated structure in which a resilient yieldable ply is restrained from lateral expansion in its plane while permitting differential displacement transverse to said plane. The invention further comprises a laminated construction including a ply having substantial dimensional stability and which is adherent to said yieldable ply to constitute the restraining means therefor.

The invention further consists in the more specific construction as hereinafter set forth.

This application is a continuation-in-part of my former application, Serial No. 428,549, filed May 10, 1954.

In the accompanying drawing:

The single view represents at a greatly enlarged scale a cross section through the blanket.

Generally described my improved blanket comprises a flexible laminated structure including a base ply possessing dimensional stability, a top ply of thin relatively hard resilient material, and an intermediate ply of softer resilient cushioning material sufficiently yielding to compensate for the irregularities in the type or other printing members supported by the blanket. Due to the dimensional stability of the base ply and its adhesion to the intermediate ply the latter is restrained from expansion or lateral enlargement in its plane while being temporarily deformable within its elastic limit in a direction transverse or normal to its plane and differentially in all portions thereof. When relieved from deforming stresses its resiliency will restore it, together with the top ply to normal form. Thus, no part of the structure will be over-stressed or deformed beyond its elastic limit which insures long life.

Various materials having the required physical characteristics may be employed for forming the several plies but I shall specifically describe certain materials which I have found to be satisfactory.

Base ply

This ply A comprises a fabric B, such for example as bleached pre-shrunk cotton, which is impregnated with a composition C comprising copolymerized butadiene acrylonitrile rubber latex and a bonding composition C consisting essentially of rubber and resin constituents applied in any suitable manner to the top surface of the fabric. The percent of impregnation of the cotton fabric by the latex can vary from seven to twelve percent (by dry weight of the fabric). The bonding composition found highly satisfactory in practice comprises copolymerized butadiene-acrylonitrile rubber, and copolymerized vinyl chloride-vinyl acetate resin suitably pigmented as to hide surface imperfections of the fabric. The copolymerized butadiene-acrylonitrile rubber latex is suitably stabilized and is a type such as Hycar 1561 or Chemigum of an equivalent nature. The proportions of the rubber and resin may be varied but highly satisfactory results are obtained by combining two parts of the rubber aforesaid with one part of the resin or by combining two parts of the resin with one part of the rubber or by intermediate compositions. In any case the proportions of the rubber, resin and pigment in the composition should be such to not only obtain the required strength and resiliency but in addition to provide the composition with the adhesive characteristics required to assure adhering the same to both the fabric and intermediate ply D, and to cover surface defects of the fabric. The composition has applied thereto a sheet E of polyvinyl chloride that is hard and resilient. In practice about a .005 to .010 gauge film is highly satisfactory. This film is compounded with a suitable plasticizer, such, for instance, as dicyclohexyl phthalate and stabilized with materials such as barium and cadmium compounds.

Top ply

The top or cover ply or lamination F is formed of a plastic which provides a hard and smooth top surface, is also resilient, impervious to moisture, highly sensitive to impressions, highly resistant to ink solvents, and capable of withstanding considerable use for long periods without appreciable wear. In practice it has been found that particularly satisfactory results are obtained by forming the cover ply of polyvinyl chloride resin plasticized with dicyclohexyl ester of phthalic acid and stabilized with barium and cadmium compounds. The dicyclohexyl ester of phthalic acid acts to impart hardness and resilience to the cover sheet and is employed in the quantities required to provide the hardness and resilience desired. As an example about forty parts of plasticizer is used for one hundred parts of resin and eighteen to twenty of the forty parts of plasticizer is dicyclohexyl ester of phthalic acid. The required stabilizing effect is obtained by using about one part of barium and one part of cadmium with one hundred parts of resin.

Intermediate ply

The intermediate ply or lamination D which forms the soft resilient cushion may be formed of a resin such as polyvinyl chloride containing plasticizers and stabilizing agents. The plasticizer is used in sufficient quantities to afford the degree of softness and resiliency required, and satisfactory results have been obtained by employing phthalates as plasticizing agents. In order to maintain the relatively soft, resilient qualities of the product for long periods of use, barium and cadmium compounds are preferred as a stabilizing agent. One part of barium compound with one part of cadmium compound for one hundred parts of resin has been found satisfactory.

The relative thickness of the various plies or laminations may be varied but preferably the top ply is from five to ten gauge (.005–.010 inch) and the intermediate ply from twenty to thirty gauge (.020–.030 inch). The bottom ply is of greater thickness which varies with the fabric used. As the bonding composition is applied to the top of the impregnated fabric it might be considered as an additional ply.

All of the plies are bonded together to provide an integral unit capable of being installed in the printing equipment. The laminating or bonding operations may be accomplished in various ways, for example, after the plies are properly positioned relative to one another they may be passed between rolls or placed between plates of a press. In either case the sheets are heated during the laminating process to a temperature sufficiently high to render the adjacent surfaces adhesive.

The printer's blanket resulting from the above described assembly of plies or laminations has a working surface which is smooth and relatively hard and which is substantially impervious to moisture, resistant to ink solvents, and highly sensitive to impressions. The first mentioned properties result from the relatively hard, relatively thin top layer. The high sensitivity to impressions is a result of the combination of the strong yet resilient nature of the relatively hard, relatively thin top layer in combination with the relatively thick, relatively soft intermediate layer. The three layers D, E and F, all preferably formed of polyvinyl chloride resin, differ among themselves essentially only in thickness and in the quantity of the plasticizer included in the resin to render it softer and more plastic. Thus, the top three layers comprise upper and lower relatively thin, relatively hard laminations of polyvinyl chloride resin and an intermediate relatively thick, relatively soft lamination of polyvinyl chloride resin, all of said polyvinyl chloride resin laminations preferably including as the plasticizer dicyclohexyl phthalate, the quantity of the plasticizer being substantially greater in the intermediate lamination to render it relatively soft as compared to the relatively hard upper and lower laminations.

Lateral dimensional stability is imparted to the blanket by the woven fabric base layer, at least the upper surface of which is impregnated with a rubber. In order to effect a satisfactory bond between the polyvinyl chloride resins upper laminations and the rubber impregnated base fabric, a bonding composition consisting essentially of a rubber and resin is employed. Preferably, the rubber in the bonding composition is the same rubber used to impregnate the base fabric and the resin is the same resin or a similar resin to that employed in the fabrication of the top three laminations. In the preferred form of the invention the rubber impregnated in the base fabric and in the bonding composition is copolymerized butadiene-acrylonitrile rubber. The resin used as a component of the bonding composition may be copolymerized vinyl chloride-vinyl acetate.

The drawing and the foregoing specification constitute a description of the improved printer's blanket in such full, clear, concise and exact terms as to enable any person skilled in the art to practice the invention, the scope of which is indicated by the appended claims.

What I claim as my invention is:

1. A printer's blanket comprising a base ply including a fabric to provide lateral dimensional stability, a laminated plasticized polyvinyl chloride resin bonded to said base fabric and consisting of a relatively thick and soft intermediate lamination and upper and lower relatively hard and thin laminations, said laminations differing essentially only in the quantity of plasticizer.

2. A printer's blanket comprising a base ply including a fabric to provide lateral dimensional stability, a laminated plasticized polyvinyl chloride resin bonded to said base fabric and consisting of a relatively thick and soft intermediate lamination and upper and lower relatively hard and thin laminations, said laminations having as the plasticizer dicyclohexyl phthalate, the intermediate relatively thick lamination having more of the plasticizer than the relatively thin upper and lower laminations.

3. A printer's blanket comprising a base ply including a fabric to provide lateral dimensional stability, said fabric having at least at its upper surface an impregnation of a rubber, a bonding composition on said base ply and having as its major constituents a compatible rubber and resin, and a working surface formed by laminated plasticized resin material bonded to said base ply by said bonding composition, said laminated plasticized resin material consisting of a relatively thick and soft intermediate lamination and upper and lower relatively hard and thin laminations.

4. A printer's blanket having a relatively hard smooth upper surface which is impervious to moisture, resistant to ink solvents and highly sensitive to impressions, and having lateral dimensional stability, said blanket comprising a working surface provided by laminations of polyvinyl chloride resin plasticized by dicyclohexyl phthalate, said laminations consisting of relatively thin, relatively hard upper and lower laminations and an intermediate relatively thick, relatively soft lamination, a bonding composition at the underside of said lower lamination consisting essentially of a vinyl resin and a rubber compatible therewith, and a reinforcing base comprising a woven fabric bonded to the laminations of plasticized polyvinyl chloride by said bonding composition, said fabric having at least its upper surface impregnated with the same rubber present in said bonding composition.

5. A printer's blanket having a relatively hard smooth upper surface which is impervious to moisture, resistant to ink solvents and highly sensitive to impressions, and having lateral dimensional stability, said blanket comprising a working surface provided by laminations of polyvinyl chloride resin plasticized by dicyclohexyl phthalate, said laminations consisting of relatively thin, relatively hard upper and lower laminations and an intermediate relatively thick, relatively soft lamination, a bonding composition at the underside of said lower lamination consisting essentially of a vinyl resin and a rubber compatible therewith, and a reinforcing base comprising a woven fabric bonded to the laminations of plasticized polyvinyl chloride by said bonding composition, said fabric having at least its upper surface impregnated with the same rubber present in said bonding composition, the rubber included in the bonding composition and in the base fabric being copolymerized butadiene-acrylonitrile rubber.

References Cited in the file of this patent

UNITED STATES PATENTS

| Number | Name | Date |
|---|---|---|
| 602,797 | Annison | Apr. 19, 1898 |
| 1,777,309 | Hopkinson | Oct. 7, 1930 |
| 1,853,258 | Cattran | Apr. 12, 1932 |
| 2,065,442 | Freedlander | Dec. 22, 1936 |
| 2,232,989 | Wooddell | Feb. 25, 1941 |
| 2,330,353 | Henderson | Sept. 28, 1943 |
| 2,453,052 | Van Etten | Nov. 2, 1948 |
| 2,500,891 | Alexander | Mar. 14, 1950 |
| 2,601,525 | Howald et al. | June 24, 1952 |
| 2,653,886 | Gentle et al. | Sept. 29, 1953 |